United States Patent [19]

Menager

[11] 4,380,416
[45] Apr. 19, 1983

[54] CENTRIFUGAL PUMPS

[75] Inventor: Jean Menager, Luxembourg, Luxembourg

[73] Assignee: Societe Internationale de Mecanique Industrielle S.A., Luxembourg, Luxembourg

[21] Appl. No.: 233,307

[22] Filed: Feb. 11, 1981

Related U.S. Application Data

[63] Continuation of Ser. No. 72,617, Sep. 5, 1979, abandoned.

[30] Foreign Application Priority Data

Sep. 25, 1978 [FR] France .................. 78 27389

[51] Int. Cl.³ .................. F01D 11/08; F03B 11/00
[52] U.S. Cl. .................. 415/170 A; 277/67; 415/170 B; 415/174
[58] Field of Search .......... 415/170 A, 174, 170 B, 415/169 A; 277/67–69, 84; 308/36.1, 187.1, 187.2

[56] References Cited

U.S. PATENT DOCUMENTS 2,439,917 4/1948 Anderson .................. 277/67

FOREIGN PATENT DOCUMENTS 2182272 7/1973 France .................. 415/170 A
784928 10/1957 United Kingdom .......... 415/170 A Primary Examiner—Philip R. Coe
Assistant Examiner—Timothy F. Simone
Attorney, Agent, or Firm—Holman & Stern

[57] ABSTRACT

A centrifugal pump, of the type comprising a body, a shaft rotatable in the body via a bearing, an impeller fixed on the shaft and, between the impeller and the bearing, a mechanical seal assembly comprising a pair of engaging slide rings and an inner sleeve made of elastomeric material, fitted on the shaft, the said sleeve comprising a portion adjacent the impeller on which is fixed one of the slide rings and, at the end on the bearing side, a radial flare for holding the seal assembly in the assembled state prior to its mounting, said sleeve being extended axially, beyond said radial flare, by a lip member arranged to rub on the adjacent surface of the bearing.

9 Claims, 6 Drawing Figures

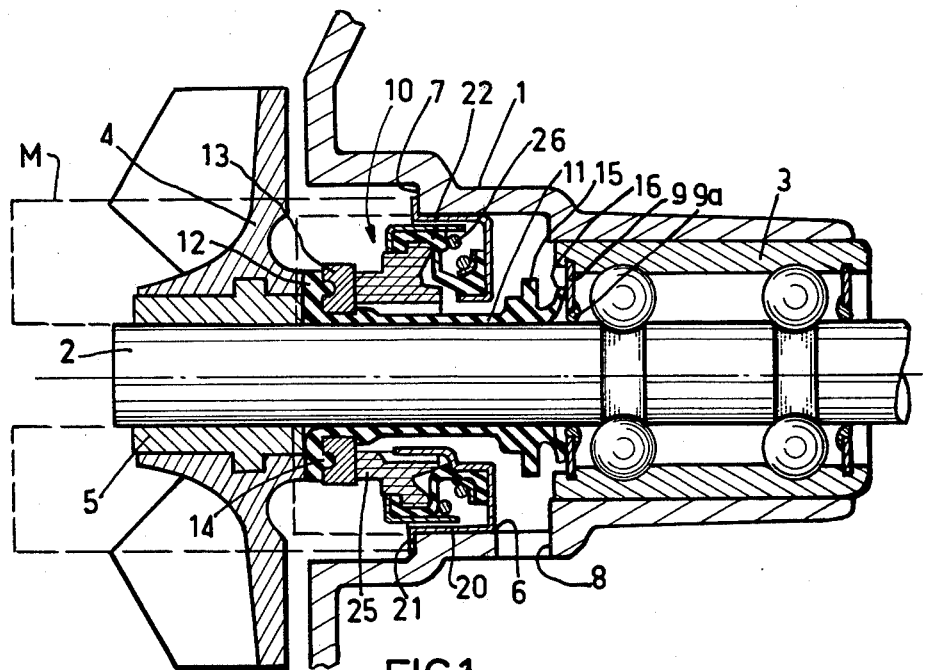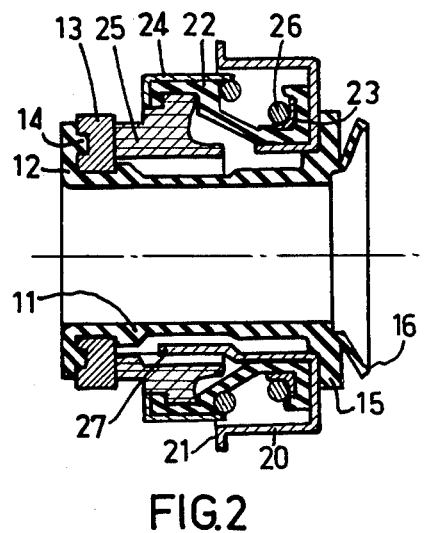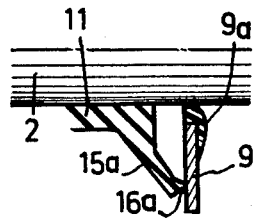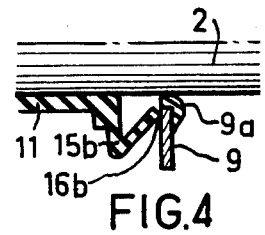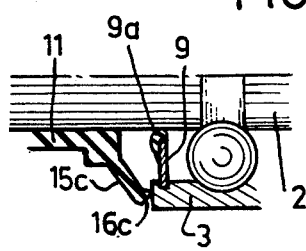

CENTRIFUGAL PUMPS

This is a continuation of application Ser. No. 06,072,617, filed Sept. 5, 1979, abandoned.

FIELD OF THE INVENTION

The present invention relates to a centrifugal pump, and particularly to a pump intended to circulate the cooling liquid in automobile vehicles.

DESCRIPTION OF THE PRIOR ART

There is disclosed in French Patent No. 2 182 272 a pump comprising a body, a shaft rotatable in the body via a bearing, an impeller fixed on the shaft and, between the impeller and the bearing, a mechanical seal assembly comprising an inner sleeve made of elastomeric material fitted on the shaft, said sleeve comprising a portion adjacent the impeller on which is fixed one of the slide rings and, at the end on the bearing side, a radial flare for holding the seal assembly in the assembled state prior to its mounting.

In pumps of this type, it is important to prevent the grease contained in the bearing from leaking along the shaft and penetrating in the seal assembly, and a lip seal is usually provided at the end of the bearing to rub on the shaft. Such lip seal may be in form of a metal washer internally provided with a rubber moulding in contact with the shaft. However, the tightness provided by such a seal is not quite satisfactory and infiltrations frequently occur in the interface between the slide rings, resulting in leaking and also harsh noises due to the increase in the friction torque ascribable to the presence of an oily phase in the interface.

BRIEF SUMMARY OF THE INVENTION

The object of the invention is to provide a pump of the type described hereinabove, in which the tightness to the grease of the bearing is achieved much more efficiently.

According to the invention, the sleeve is extended axially, beyond said radial flare, by a lip member arranged to rub on the adjacent surface of the bearing.

BRIEF DESCRIPTION OF THE SEVERAL VIEWS OF THE DRAWINGS

The invention will be more readily understood on reading the following description with references to the accompanying drawings, in which:

FIG. 1 shows, in axial section, a water pump for vehicle according to the invention, in a first embodiment;

FIG. 2 shows the seal assembly forming part of the pump of FIG. 1, in the released state;

FIGS. 3 to 5 are detail views showing modifications; and

DETAILED DESCRIPTION

Figure 6:
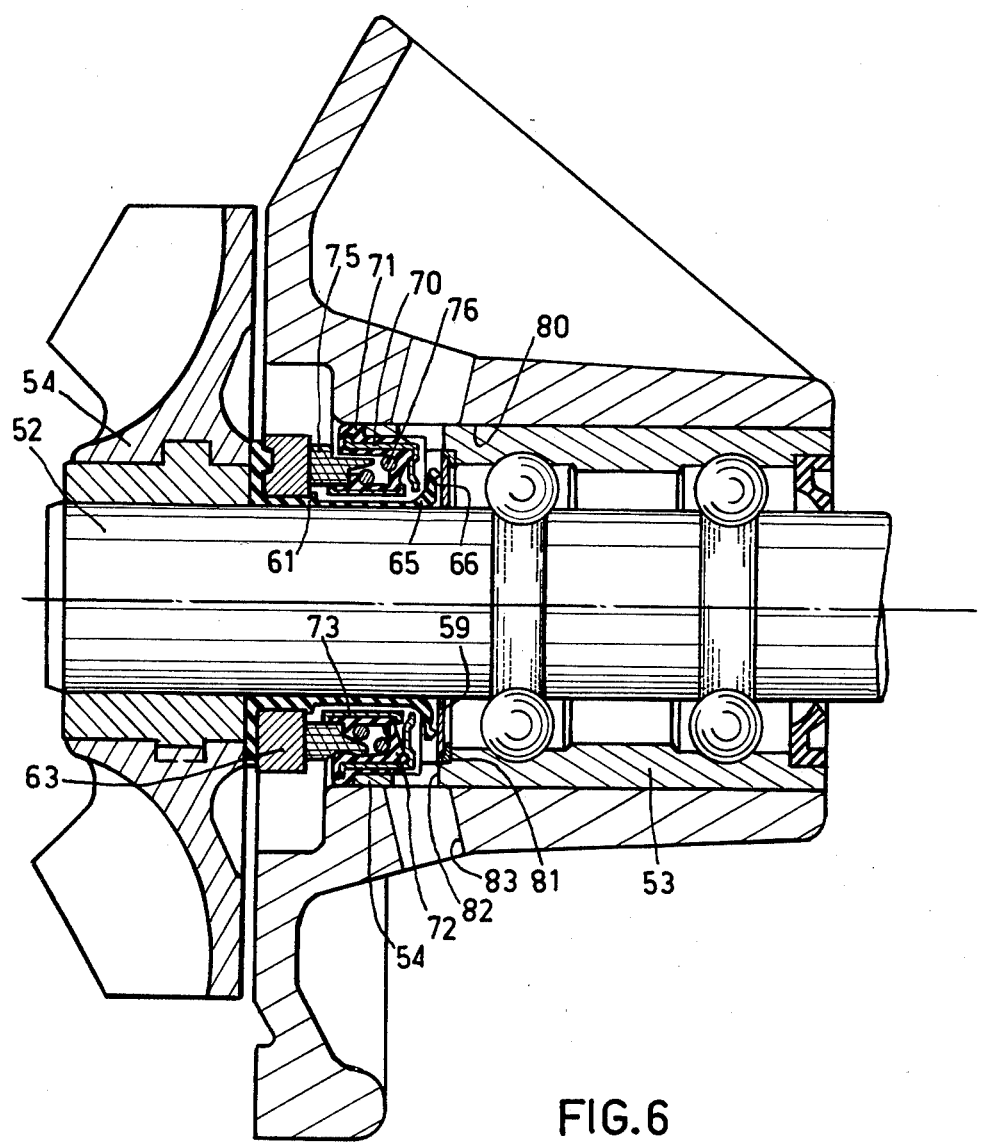
FIG. 6 shows another embodiment of the pump according to the invention.

Referring now to the drawings, FIG. 1 shows a water pump for an automobile vehicle, which comprises a body 1, a shaft 2 rotatable in the body via a ball bearing of which the outer cage is referenced 3, an impeller 4 fixed to the shaft 2 via a hub 5 and, between the bearing and the impeller, a mechanical seal assembly comprising slide rings, generally designated by reference 10 and made in the form of a self-contained unit, as shown in FIG. 2.

The seal assembly comprises an inner sleeve 11 made of elastomeric material which holds the seal assembly in the assembled state prior to its mounting in the pump. The sleeve 11 comprises a radial flange 12 engaging the front face of the hub of the impeller 5 and, against this flange, is fixed a counter-ring 13 made of friction material which presses the sleeve 11 so as to achieve an interference fit with the shaft 2 and is thus rotatable with the shaft 2. The flange 12 comprises an annular extension 14 which penetrates in a recess, of corresponding shape, provided in the counter-ring.

The fixed part of the seal assembly comprises a metal casing 20 which has an interference fit with a bore 6 in the pump body 1 and abuts against a shoulder 7 by its radially extending portion 21. At the inner part of the casing 20 there is secured one end of a resilient bellows 22 by means of a metal ring 23, and there is further provided a metal collar 24, whose outer diameter is slightly smaller than the inner diameter of the outer portion of the casing, and which acts to connect the other end of the bellows 22 and a slide ring 25 in contact with the counter-ring 13. A frusto-conical spring 26 is mounted between the two ends of the bellows 22 to urge the slide ring into contact with the counter-ring so as to achieve tightness in use during friction of the counter-ring 13 on the ring 25. In addition, the inner part of the casing 20 extends by tongues 27 which engage with recesses formed inside the slide ring 25.

This arrangement of the seal assembly is described in greater detail in French Patent Application No. 2 394 729.

The sleeve 11 is provided at its end remote from the flange 12 with a radial flare 15 which, as shown in FIG. 2, acts as a stop to hold the seal assembly in the assembled state prior to its mounting. An opening 8 is formed in the pump body at the level of the flare 15, which thus acts as a flinger to throw out by centrifugation the drops of water liable to leak along the interface between the slide rings.

The sleeve 11 extends beyond the flare 15 by a lip 16 which rubs on a metal washer 9 mounted at the end of the outer cage 3 of the ball bearing, which washer 9 bears on its inner periphery a rubber moulding 9a which rubs on the shaft 2, the assembly of the washer 9 and the moulding 9a conventionally constituting a lip seal of reduced axial dimensions.

Due to the fact that the lip 16 formed as the end of the sleeve 11 rubs on the outer face of the washer 9, the grease liable to flow from the bearing 3 and past the lip seal 9, 9a will be stopped by the lip 16 and prevented from flowing further in the direction of the seal assembly. It should further be noted that the moulding 9a may be omitted as the lip 16 alone provides sufficient tightness.

The seal assembly 10 is assembled with the aid of the mandrel M shown in broken lines in FIG. 1, which comprises an outer part which serves to push on the radial end portion 21 of the casing 20 to fit the latter until it comes into abutment with the shoulder 7 of the pump body, and a central part which serves to push on the flange 12 to fit the sleeve 11 on the shaft 2.

FIGS. 3 to 5 show modified embodiments of the flare 15 and the lip 16. In the modification of FIG. 3 which is of reduced axial dimension, the lip 16a is formed as an extension of the flange 15a. FIG. 4 shows an embodiment in which the lip 16b is also formed as an extension of the flange 15b, but is turned back inwardly and engages washer 9 nearer the shaft, and with a force which increases with the speed of rotation of the shaft 2 by virtue of the centrifugal force. Finally, FIG. 5 shows a modification somewhat similar to that of FIG. 3, but in which the lip 16c rubs on the outer face of the outer cage 3 of the bearing, and not on the washer 9.

The invention has been described in the case of the seal assembly 10 forming a self-contained unit, but it is also applicable in the case of the seal assembly and the impeller with its hub forming a self-contained unit, as described in French Patent Application No. 2 357 760. In this case, the flange 12 of the sleeve 11 is fixed to the hub 5 of the impeller, and the impeller 4 has formed therein angularly distributed axial openings to allow the mounting of the unit on the shaft of the motor, the tubular part of the mandrel M shown in FIG. 1 being replaced by finger-like extensions which pass through the openings of the impeller. Apart from these differences, the foregoing description remains applicable.

The embodiment shown in FIG. 6 differs from that of FIG. 1 essentially in that the fixed part of the seal assembly is mounted in an extension 54 of the outer cage 53 of the ball bearing.

The elastomeric bellows 72 is in this case moulded over the metal casing 70 and its outer peripheral part therefore engages the extension 54. The bellows terminates in a radial bead 71 in abutment against the end of the extension 54 and in contact with the wall of the bore 80 of the pump body 51. The bead 71 provides water tightness and thus protects the outer cage 53 from corrosion.

The inner end of the bellows 72 is made fast with the slide ring 75 by a metal ring 73, and a spring 76 is mounted between the ends of the bellows to ensure sealing engagement between the ring 75 and the counter-ring 63. The counter-ring 63 is tightened on the shaft 52 by means of the elastomeric sleeve 61. The latter comprises on the side of the bearing, a radial flare 65 terminating in a lip 66 which rubs on a washer 59 fixed to the outer cage 53 of the bearing via a ring 81.

The extension 54 comprises openings 82 in correspondance with flange 65 and the pump body also presents openings 83 aligned with the openings 82, so as to place in communication the space between the seal assembly and the bearing with the outside, and to allow water drops to be thrown out by the flange 65.

For mounting, the whole seal assembly is firstly assembled with the shaft provided with its bearing, the fixed part of the seal assembly being fitted inside the extension 54, whilst the sleeve 61 is fitted on the shaft 52.

The outer cage 53 of the bearing is then fitted in the smooth bore 80 of the pump body with the seal assembly first, the bead 71 rubbing on the bore 80. All that remains, is then to mount the impeller 54 on the shaft 52.

This modification allows a remarkable reduction in the overall axial length of the pump.

What is claimed is:

1. A centrifugal pump, of the type comprising a body, a shaft rotatably mounted in the body via a bearing, an impeller fixed on the shaft and, between the impeller and the bearing, a mechanical seal assembly comprising a pair of engaging slide rings and an inner sleeve made of elastomeric material fitted on the shaft, said sleeve comprising a portion at the end adjacent the impeller on which is fixed one of the slide rings and, at the other end adjacent the bearing, a radial flare for holding the seal assembly in the assembled state prior to its mounting and after mounting functioning as a flinger to radially throw off any liquid on its surface during operation of the pump, an axial extension on said sleeve between said radial flare and said bearing, a seal member at the bearing end of said axial extension comprising a lip member integral with said sleeve and having an axially facing portion which in use sealingly engages a part of said bearing to prevent bearing lubricant from leaking into said seal assembly, and a radially extending opening through said pump body substantially aligned with said radial flare.

2. A pump as claimed in claim 1, wherein said bearing is a ball bearing having a washer fixed to the outer cage of the bearing and said lip member sealingly engages against said washer.

3. A pump as claimed in claim 2, wherein said lip member is turned radially inwardly.

4. A pump as claimed in claim 1, wherein said bearing is a ball bearing having a radial wall on the outer cage thereof, and said lip member sealingly engages against said radial wall.

5. A pump as claimed in claim 1, wherein the bearing is a ball bearing having an outer cage and said outer bearing cage has an axial extension in which is fitted the fixed part of the seal assembly.

6. A pump as claimed in claim 5, wherein the seal assembly includes a bellows which comprises a peripheral portion molded on a metal casing which is fitted in said extension, said peripheral portion terminating in a radial bead which sealingly engages the inner wall of the pump body.

7. A pump as claimed in claim 6, wherein said extension and pump body have openings substantially aligned with the radial flare of the sleeve.

8. A seal assembly for a centrifugal pump, comprising a sleeve of elastomeric material, a counter-ring tightened on an end portion of the sleeve, a slide ring in contact with the counter-ring, a resilient bellows one end of which supports the slide ring and the other end of which is fixed to a casing comprising a tubular part, a spring biasing the slide ring into engagement with the counter-ring, the sleeve having at its other end a radial flare which functions as a stop for the casing to hold the seal assembly in the assembled state when not in use and when rotating in use functions as a flinger to radially throw off any liquid on its surface during operation of the pump, an axial extension integral with said sleeve and extending beyond said radial flare, a seal member at the outer end of said axial extension comprising a circular lip member integral with said axial extension and having an axially facing portion which in use functions as a seal when engaging a bearing part to prevent bearing lubricant from leaking into said seal assembly.

9. A seal assembly as claimed in claim 8, wherein said bellows comprises a peripheral portion molded on said tubular part of the casing and said peripheral portion is provided with a radial bead.

* * * * *